United States Patent
Matus et al.

(10) Patent No.: US 11,807,770 B2
(45) Date of Patent: Nov. 7, 2023

(54) THIN FILM COATING PACKAGING FOR DEVICE HAVING MELTABLE AND WETTING LINKS

(71) Applicant: Littelfuse, Inc., Chicago, IL (US)

(72) Inventors: Yuriy Borisovich Matus, Pleasanton, CA (US); Martin G. Pineda, Fremont, CA (US); Boris Golubovic, Chicago, IL (US); Deepak Nayar, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 196 days.

(21) Appl. No.: 17/331,808

(22) Filed: May 27, 2021

(65) Prior Publication Data

US 2021/0388230 A1 Dec. 16, 2021

Related U.S. Application Data

(60) Provisional application No. 63/039,177, filed on Jun. 15, 2020.

(51) Int. Cl.
| | |
|---|---|
| *B05D 5/12* | (2006.01) |
| *C09D 175/04* | (2006.01) |
| *C09D 177/00* | (2006.01) |
| *H01H 85/143* | (2006.01) |
| *B05D 1/00* | (2006.01) |
| *B05D 1/18* | (2006.01) |
| *B05D 1/30* | (2006.01) |

(52) U.S. Cl.
CPC ............. *C09D 175/04* (2013.01); *B05D 5/12* (2013.01); *C09D 177/00* (2013.01); *H01H 85/143* (2013.01); *B05D 1/005* (2013.01); *B05D 1/18* (2013.01); *B05D 1/30* (2013.01)

(58) Field of Classification Search
CPC . B05D 5/12; B05D 1/005; B05D 1/18; B05D 1/30; H01H 5/143
USPC ........................................................ 427/385.5
See application file for complete search history.

(56) References Cited

U.S. PATENT DOCUMENTS

| | | | | |
|---|---|---|---|---|
| 4,237,441 | A | * 12/1980 | van Konynenburg | ... H01B 1/24 252/511 |
| 4,545,926 | A | * 10/1985 | Fouts, Jr. | ............... H01C 7/027 252/502 |
| 5,567,746 | A | 10/1996 | Gay | |
| 5,663,861 | A | * 9/1997 | Reddy | .................. H01C 1/1406 361/103 |
| 5,699,032 | A | * 12/1997 | Ulm, Jr. | ............. H01H 85/0411 337/404 |
| 9,150,746 | B1 | * 10/2015 | Li | ........................ C09D 11/08 |

(Continued)

FOREIGN PATENT DOCUMENTS

| | | |
|---|---|---|
| CN | 101593644 A | 12/2009 |
| CN | 201584389 U | 9/2010 |

(Continued)

*Primary Examiner* — Brian K Talbot
(74) *Attorney, Agent, or Firm* — KDW Firm PLLC

(57) ABSTRACT

A method for creating a dielectric thin-film coating for devices having a fusible element is disclosed. The method comprises mixing insoluble and soluble polymers in solid form and exposing the mixture to heat to create a melt mixture. The melt mixture is then dissolved in a solvent to create a slurry which can then be deposited on the device as a thin-film coating to create an interior insulation layer or an external surface.

15 Claims, 3 Drawing Sheets

(56) References Cited

U.S. PATENT DOCUMENTS

| | | | | |
|---|---|---|---|---|
| 2006/0267721 A1* | 11/2006 | Graf | ........................ | H01C 7/126 |
| | | | | 337/297 |
| 2007/0159292 A1* | 7/2007 | Chang | .................... | H01H 85/38 |
| | | | | 337/159 |
| 2017/0317484 A1* | 11/2017 | Nakada | .................... | H01G 4/40 |

FOREIGN PATENT DOCUMENTS

| | | | | |
|---|---|---|---|---|
| CN | 104781901 A | | 7/2015 | |
| EP | 0970487 B1 | * | 1/2000 | |
| EP | 1912236 A1 | * | 4/2008 | ............. H01C 13/02 |
| JP | S6266604 A | | 3/1987 | |
| JP | H10308161 A | | 11/1998 | |
| TW | 200402077 A | * | 2/2004 | ........... H01H 69/022 |
| WO | 2012047246 A1 | | 4/2012 | |

* cited by examiner

200

```
┌─────────────────────────────────────────┐
│ Combine insoluble polymer and soluble   │
│ polymer in solid form                   │
│ 202                                     │
└─────────────────────────────────────────┘
                    │
┌─────────────────────────────────────────┐
│ Create a melt mix of the insoluble      │
│ polymer and the soluble polymer by      │
│ exposing to heat                        │
│ 204                                     │
└─────────────────────────────────────────┘
                    │
┌─────────────────────────────────────────┐
│ Let melt mix cool and solidify          │
│ 206                                     │
└─────────────────────────────────────────┘
                    │
┌─────────────────────────────────────────┐
│ Cut solidified melt mix into chips to   │
│ increase surface area                   │
│ 208                                     │
└─────────────────────────────────────────┘
                    │
┌─────────────────────────────────────────┐
│ Expose melt mix to solvent to create    │
│ a slurry                                │
│ 210                                     │
└─────────────────────────────────────────┘
                    │
┌─────────────────────────────────────────┐
│ Deposit slurry on device to create      │
│ coating                                 │
│ 212                                     │
└─────────────────────────────────────────┘
```

*FIG. 2*

THIN FILM COATING PACKAGING FOR DEVICE HAVING MELTABLE AND WETTING LINKS

FIELD OF THE INVENTION the present invention relates generally to the field of circuit protection devices and, in particular, to fuses, thermally-protected metal-oxide varistors (TMOVs) and thermal cut-off devices (TCOs).

BACKGROUND OF THE INVENTION

Fuses and TMOVs are commonly-known circuit protection devices typically installed between a source of electrical power and a component in the electrical circuit that is to be protected. Devices such as fuses and TMOVs have meltable links that will melt in an overcurrent or overvoltage condition. Such devices may be low-profile or wafer-based devices and may be covered with a dielectric coating that accommodates de-wetting. However, the current packaging for such devices is difficult to deposit due to its relative thickness. As such, current dielectric coatings are expensive and difficult to deposit on a scale below 50 μm.

Ideally a coating for a meltable link would meet three criteria. First, the coating should have dielectric properties. In particular, the coating should act as an insulator. Second, the coating should be able to cover the meltable link while not restricting the meltable link from flowing once the link has reached its melting temperature. Some current coatings may hold the meltable link in place after the link has reached its melting temperature, thereby restricting the circuit from opening. Third, the covering should be able to be deposited when in the solution phase to create coatings on the scale of 50 μm or less.

Current methods of coating these devices fail to meet all three criteria. For instance, some polymers, silicon polyester and polypropylene, when used as a coating will meet the first criteria of having dielectric properties but fail to meet the second criteria of covering the meltable link without restricting the flow of the link after melting. Current devices may use a polymer from the polyamide family, which may meet the first two criteria but fail to meet the third criteria of being able to be deposited from a solution phase, thereby resulting in a thin coating layer.

Therefore, would be desirable to have a coating for low-profile and wafer-based devices having meltable links that meet all three of the criteria.

SUMMARY OF THE INVENTION

A coating for devices having meltable links may be created by a method which includes the steps of melt mixing an insoluble polymer with a soluble polymer and exposing the melt mixed to a solvent that will create a slurry which may then be deposited with any well-known technique, for example, by spin coating, dip coating, dip coating, etc. Coatings created in accordance with the present invention may be used as an insulation layer on the interior devices or may be used as an exterior coating.

Devices made on a wafer and/or extremely small devices are thus able to have a thin dielectric coating that eliminates expensive packaging. The coating can accommodate controlled de-wetting that will allow the fast opening of the devices and will also serve to protect any exposed metal surfaces of the device from corrosion.

BRIEF DESCRIPTION OF THE DRAWINGS

FIG. 2 is a flowchart showing the steps of the method for producing and applying the coating of the present invention.

DETAILED DESCRIPTION

Figure 1:
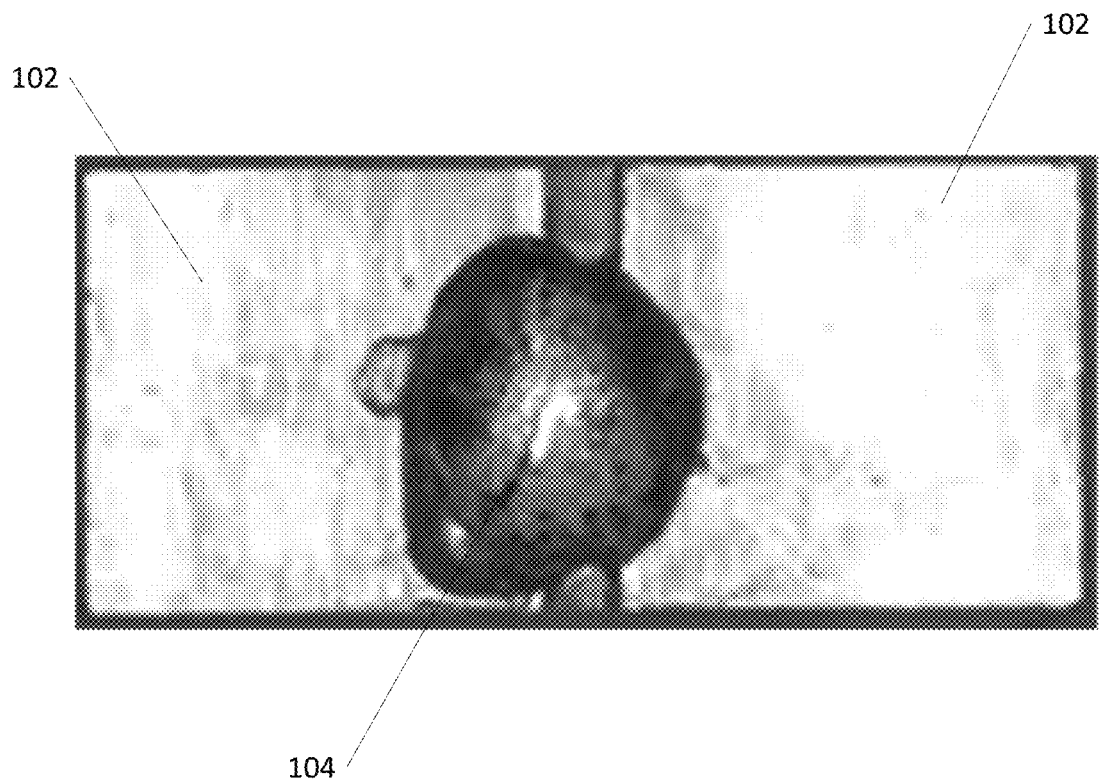
FIG. 1 is a photographic depiction of the prior art example of a device having a meltable link.

The solution-based coating of the present invention creates a thin dielectric layer suitable for use over a meltable link. The coating serves as packaging and creates a low profile for a fuse or TMOV. The dielectric film accommodates wetting properties of the fuses and generate packaging film on the scale of 50 microns FIG. 1 is a photographic representation of a portion of a device having a meltable element. The device's metal electrodes 102, are typically made from copper. The metal electrodes are bridged by a solder ball 104. Solder ball 104 is designed to melt in reaching a certain temperature and open the circuit. The device of FIG. 1 is typical of the type of devices which would benefit from the coating of the present invention.

FIG. 2 is a flowchart showing the steps of a method 200 for creating the coating of the present invention. In step 202, the insoluble polymer and the soluble polymer are combined. The insoluble and soluble polymers are commercially available and come in the physical form of pellets or chips.

In some embodiments, the insoluble polymer may be selected from a group comprising polyamides and their copolymers and grafted materials (e.g., hot glue). In other embodiments, low temperature high density polyethylene (HDPE) or low density polyethylene (LDPE), low Tg (glass transition temperature) PETs (polyethylene terephthalate), soluble or semi-soluble EBA (ethylene butyl acrylate) and EMA (ethylene methyl acrylate) (referred by the general term of hot glues and fatty acids or wood pitches, often referred as rosin), may be used as the insoluble polymer. In a preferred embodiment, the insoluble polymer is a polyamide. The insoluble polymer typically is in the form of pellets ranging in size from ⅛" to ¼" in size.

Many soluble polymers are good candidates for use in this invention. In some embodiments, the soluble polymer may be for example, soluble polyurethanes or waxes, which are soluble in DMF (dimethylformamide) or aromatic solvents, such as xylene, toluene or anisole, or any other soluble polymer. In other embodiments of the invention, the soluble polymer may be a polyamic acid or PVDF (polyvinylidene fluoride), which are soluble in DMF or NMP (N-Methyl-2-pyrrolidone). In general, any soluble polymer may be used as long as the soluble polymer has a melting point below about 130° C. (e.g., below the melting point of the solder link, does not constrain the molten solder and does not suppress arcing. In a preferred embodiment of the invention, a low melting temperature polyurethane is used as the soluble polymer. Soluble polymers typically are in the form of chips ranging in size from ½ mm to 5 mm.

The insoluble and soluble polymers may be mixed in an insoluble to soluble ratio of about 75:25, but in preferred embodiments, the ratio would be between 40:60 and 60:40.

In step 204, the insoluble and soluble polymer pellets are melted to create a melt mixture by exposing to heat. The mixture may be melted and mixed by an industrial machine containing a heating element and mixing blades, or, preferably, an extruding machine capable of heating and mixing the insoluble and soluble polymer to create the melt mixture and thereafter extruding the melt mixture into a wire or fiber having a relatively small cross-section.

The temperature at which the insoluble and soluble polymers are melted is dependent upon the selection of specific polymers, but, in general, the mixture may be heated to at least the temperature of the material having the higher melting point. In other embodiments, the mixture may be melted at a temperature between the melting points of the insoluble and soluble polymers, wherein the mixing blades of the mixing machine create a sheer force within the mixture that tends to increase the temperature of the mixture. In some embodiments of the invention, the melt mixture may be cut into small pallet size pieces as it exits from the extruding machine to increase the surface area of the melt mixture.

Step 206 of the process is an optional step in which the melt mixture is allowed to cool and solidify and, in optional step 208, the solidified melt mixture is cut into chip or pellet-sized pieces to increase the surface area. In other embodiments of the invention, steps 206 and 208 may be skipped and the melt mixture may be extruded or otherwise placed in melted form directly into a solvent.

In step 210 of the process, the melt mix is exposed to a solvent, and when mixed, will eventually create a slurry. The increased surface area of the melt mixture created by cutting the melt mixture into pellet-sized pieces makes the process of creating the slurry easier. The solvent may comprise, for example, xylene, toluene, anisole, DMF (Dimethylformamide) or NMP (N-Methylpyrrolidone), or any solvent capable of dissolving the soluble polymer. The choice of solvent is highly dependent on the choice of soluble polymer. The melt mixture and solvent are mixed in a ratio of approximately 3 parts weight melt mixture and 7 parts weight solvent but again, this is highly dependent on the choice of polymers and solvents. The resulting slurry may have a viscosity of between 1 cps and about 10,000 cps.

In step 212, once the slurry has been created it may be informally deposited on the device as either an interior insulating layer or an exterior coating. The coating may be applied by any well-known means, for example, spin coating, deep coating, dip coating, etc.

Figure 3:
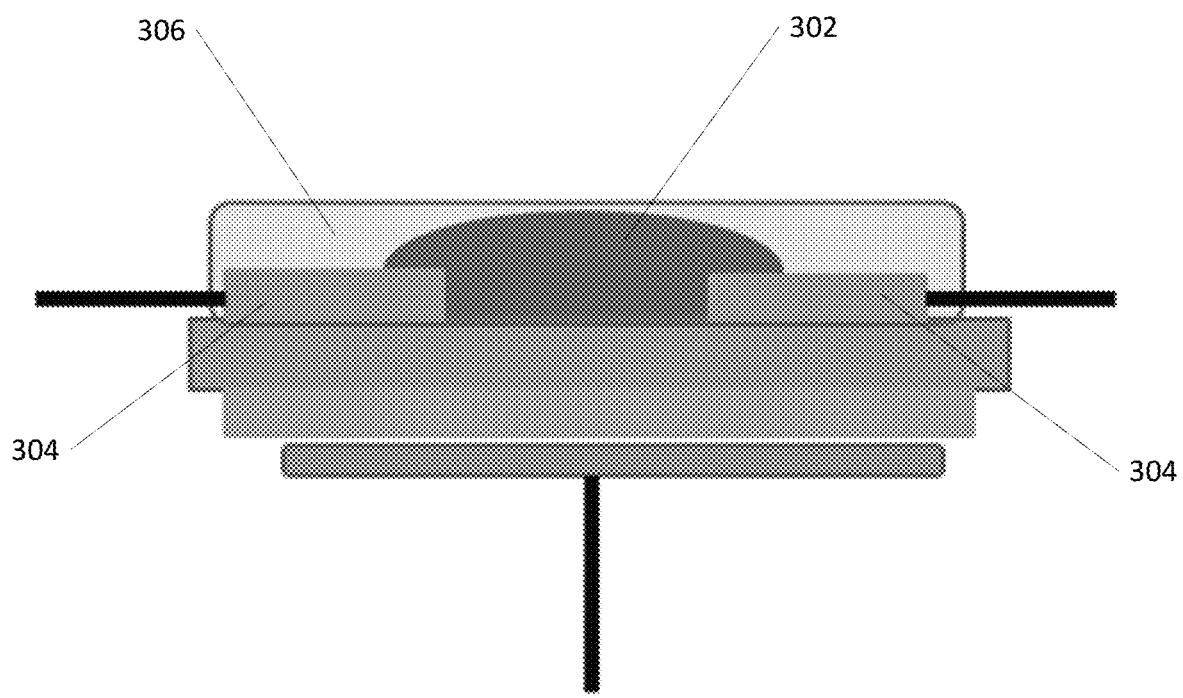
FIG. 3 is a schematic diagram of a device having a meltable link, showing the covering of the present invention in place on the device.

FIG. 3 shows a typical device having copper electrodes 304 joined by a meltable link 302, typically, a solder ball. The conformal coating of the present invention is shown as 306 in the figure.

The coating made in accordance with the method disclosed herein meets all three design criteria set forth in the Background of the Invention. The method creates a dielectric coating having insulating properties. The coating, once conformally deposited on a meltable element, allows the meltable element to flow when the meltable element reaches its melting point. Lastly, the coating can be applied as a thin-film in the range of 50 µm in thickness and, as such, is suitable for use with low-profile TMOVs and other wafer-based devices.

We claim:

1. A method for creating a thin-film coating, comprising:
   mixing an insoluble polymer and a soluble polymer in solid form;
   creating a melt mixture of the insoluble polymer and the soluble polymer by heating and mixing the insoluble polymer and the soluble polymer;
   exposing the melt mixture to a solvent to create a slurry; and
   depositing the slurry on a device to create the thin-film coating.

2. The method of claim 1, wherein the insoluble polymer is selected from a group comprising polyamides, copolymers, high density polyethylene, low density polyethylene, polyethylene terephthalate, soluble or semi-soluble ethylene butyl acrylate and ethylene methyl acrylate polymers.

3. The method of claim 1 wherein the insoluble polymer is a polyamide.

4. The method of claim 1, wherein the soluble polymer is selected from a group comprising soluble polyurethanes or waxes, polyamic acid and polyvinylidene fluoride.

5. The method of claim 1 wherein the soluble polymer is a polyurethane.

6. The method of claim 1, wherein the solvent is selected from a group comprising xylene, toluene, anisole, dimethylformamide and N-Methyl-2-pyrrolidone.

7. The method of claim 1, wherein the insoluble polymer and soluble polymer are present in the melt mixture in a ratio of between 40:60 and 60:40.

8. The method of claim 1, wherein the melt mixture and solvent are mixed in a ratio of 3 weight parts melt mixture and 7 weight parts solvent.

9. The method of claim 1, wherein the insoluble polymer and soluble polymer mixture is heated to a temperature equal to or exceeding a melting temperature of either the insoluble polymer or the soluble polymer, whichever is higher.

10. The method of claim 1, wherein the slurry is deposited on the device using a method selected from a group comprising spin coating, drip coating and dip coating.

11. The method of claim 1, wherein the device comprises a meltable element between two electrodes and further wherein the thin-film coating covers at least the meltable element.

12. The method of claim 1 wherein the thin-film coating has dielectric properties.

13. The method of claim 11, wherein the thin-film coating allows the meltable element to flow away from the electrodes after the meltable element has reached its melting point.

14. The method of claim 1, wherein the thin-film coating is less than 50 microns in thickness.

15. The method of claim 1, wherein the insoluble polymer and soluble polymer mixture is heated to a temperature between melting points of the insoluble polymer and the soluble polymer;
   wherein mixing blades of a mixing machine create a sheer force within the mixture to increase the temperature of the mixture to a temperature equal to or exceeding a melting temperature of either the insoluble polymer or the soluble polymer, whichever is higher.

* * * * *